US008850679B2

(12) United States Patent
Bender

(10) Patent No.: US 8,850,679 B2
(45) Date of Patent: Oct. 7, 2014

(54) PIPE ALIGNING TOOL

(76) Inventor: Quinn Bender, Edmonton (CA)

(*) Notice: Subject to any disclaimer, the term of this patent is extended or adjusted under 35 U.S.C. 154(b) by 0 days.

(21) Appl. No.: 13/606,554

(22) Filed: Sep. 7, 2012

(65) Prior Publication Data

US 2013/0067709 A1    Mar. 21, 2013

Related U.S. Application Data

(60) Provisional application No. 61/537,252, filed on Sep. 21, 2011.

(51) Int. Cl.
*B25B 27/14* (2006.01)
*B23Q 3/00* (2006.01)
*B25B 1/20* (2006.01)
*B25B 5/14* (2006.01)
*B25B 27/16* (2006.01)

(52) U.S. Cl.
CPC ..................... *B25B 5/147* (2013.01)
USPC .................. 29/272; 29/464; 269/43

(58) Field of Classification Search
USPC ................. 29/272; 269/43; 81/53.2
See application file for complete search history.

(56) References Cited

U.S. PATENT DOCUMENTS

| 3,925,854 | A | * | 12/1975 | McFadden | 29/252 |
| 3,952,936 | A |   | 4/1976  | Dearman  |        |
| 4,174,996 | A | * | 11/1979 | Hunter   | 156/499 |
| 4,279,177 | A | * | 7/1981  | Yamashita | 475/5 |
| 4,356,615 | A | * | 11/1982 | Dearman  | 29/525 |
| 4,378,937 | A | * | 4/1983  | Dearman  | 269/6 |
| 4,726,575 | A | * | 2/1988  | Dearman  | 269/43 |
| 4,895,055 | A | * | 1/1990  | Bisping et al. | 81/53.2 |
| 5,165,160 | A | * | 11/1992 | Poncelet | 29/464 |
| 5,560,091 | A | * | 10/1996 | Labit, Jr. | 29/272 |
| 5,865,430 | A | * | 2/1999  | Conover et al. | 269/43 |
| 6,161,296 | A | * | 12/2000 | Davio    | 33/412 |
| 6,327,763 | B2 | * | 12/2001 | Stephen | 29/272 |
| 6,641,124 | B2 | * | 11/2003 | Melanson | 269/43 |
| 6,651,967 | B1 |   | 11/2003 | Barber   |        |
| 6,983,525 | B2 | * | 1/2006  | Moreno   | 29/464 |
| 7,168,169 | B2 | * | 1/2007  | Moreno   | 30/394 |
| 8,266,776 | B2 | * | 9/2012  | Dwileski, Jr. | 29/271 |
| 2007/0256288 | A1 | * | 11/2007 | Vermaat | 29/464 |
| 2008/0263850 | A1 | * | 10/2008 | Dwileski | 29/464 |

* cited by examiner

*Primary Examiner* — Lee D Wilson
*Assistant Examiner* — Alvin Grant
(74) *Attorney, Agent, or Firm* — Ryan W. Dupuis; Kyle R. Satterthwate; Ade & Company Inc

(57) ABSTRACT

A pipe alignment tool for aligning abutted ends of first and second pipe sections to be joined includes a clamp member adapted to be clamped circumferentially about the first pipe section and one or more pipe engaging members mounted on the clamp member adapted to extend across a seam between the abutted ends of the first and second pipe sections to overlap the second pipe section. A bearing member is rotatably supported on each pipe engaging member for rolling contact with the second pipe section to assist in positioning the second pipe section relative to the first pipe section.

17 Claims, 5 Drawing Sheets

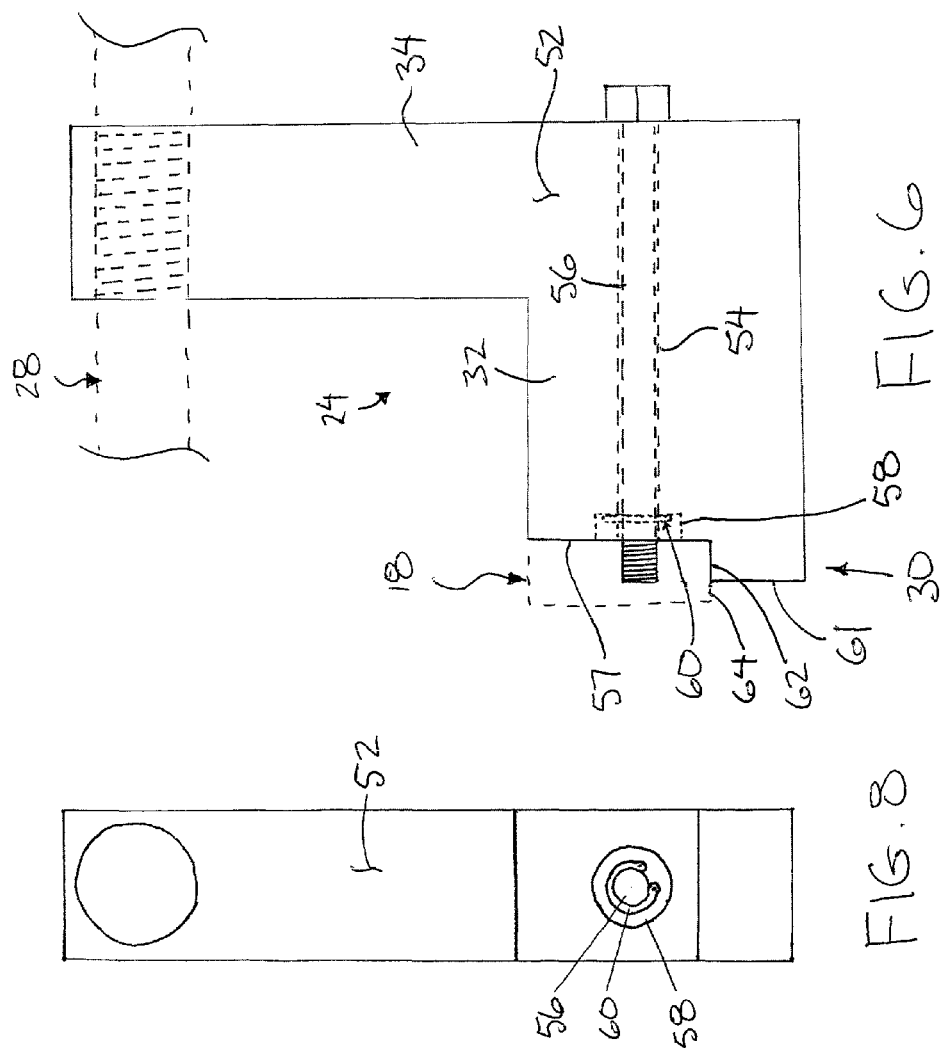

PIPE ALIGNING TOOL

This application claims the benefit under 35 U.S.C. 119(e) of U.S. provisional application Ser. No. 61/537,252, filed Sep. 21, 2011.

FIELD OF THE INVENTION

The present invention relates to a tool for aligning the ends of two abutted sections of pipe relative to one another, and more particularly the present invention relates to a pipe aligning tool including a clamp member for clamping about one pipe section and one or more pipe engaging members on the clamp member for engaging the other pipe section.

BACKGROUND

When connecting pipelines or distributed plumbing in buildings or the like, it is common to attach pipe sections in end to end abutment with the pipes in proper alignment with one another. To achieve this alignment, various tools have been proposed as disclosed for example in U.S. Pat. Nos. 4,726,575 and 3,952,936 both to Dearman, U.S. Pat. No. 6,651,967 by Barber and U.S. Pat. No. 5,560,091 by Labit Jr. Typical prior art devices involve clamping about one of the pipe sections with pipe engaging members extending from the clamp to engage the other pipe section. In each instance, the pipe engaging members frictionally engage the second pipe, which may cause damage to the second pipe as the second pipe is displaced relative to the first pipe during pipe alignment. Furthermore, the friction makes it difficult to align the second pipe by rotation or longitudinal displacement relative to the first pipe so that accurate alignment is somewhat resisted by the frictional forces.

SUMMARY OF THE INVENTION

According to one aspect of the invention there is provided a pipe alignment tool for aligning abutted ends of first and second pipe sections to be joined, the tool comprising:

a clamp member extending about a longitudinal axis so as to be adapted to be clamped circumferentially about the first pipe section adjacent the end of the pipe;

at least one pipe engaging member mounted on the clamp member so as to extend longitudinally from a first end fixed to the clamp member to an opposing second end adapted to overlap the second pipe section such that the pipe engaging member extends across a seam between the abutted ends of the first and second pipe sections; and a bearing member rotatably supported on said at least one pipe engaging member so as to be adapted for rolling contact with the second pipe section.

By providing a bearing member which is free rolling in contact with the second pipe section, there is no frictional force resisting the movement of the second pipe section relative to the first section during alignment while carrying the vertical load of the second pipe relative to the first pipe. In particular, the bearing member allows the second pipe to be readily located about its longitudinal axis as well as axially displaced relative to the first pipe to ensure an accurate alignment prior to joining the pipes either by welding or by bolting pipe flanges together for example.

Preferably the bearing member comprises a ball supported on said at least one pipe engaging member for rolling movement about both an axis oriented parallel to the longitudinal axis and an axis oriented perpendicularly to the longitudinal axis of the clamp member.

The bearing member may be supported on said at least one pipe engaging member for displacement in a radial direction relative to the longitudinal axis of the clamp member. In this instance a biasing member preferably urges the bearing member of said at least one pipe engaging member in the radial direction towards the longitudinal axis.

A grease port may be formed in said at least one pipe engaging member in communication between the bearing member and a nipple supported on the pipe engaging member spaced from the bearing member.

Each pipe engaging member may comprise a first portion extending in a direction of the longitudinal axis and a second portion at the second end of the member extending in a radial direction from the first portion towards an inner end supporting the bearing member rotatably thereon. The second portion is preferably adjustable in the radial direction relative to the first portion.

In one embodiment the second portion may comprise a threaded rod in threaded connection with the first portion to provide adjustment in the radial direction.

Alternatively, the second portion may comprise a hydraulic piston cylinder assembly in which the cylinder is supported on the first portion and the piston supports to the bearing member thereon so as to be radially adjustable relative to the first portion.

Preferably a set of four pipe engaging members are supported at evenly spaced positions in a circumferential direction about the longitudinal axis of the clamp member.

In some embodiments, the clamp member may include a plurality of designated mounting locations formed thereon at circumferentially spaced apart positions in which each pipe engaging member is arranged to be selectively supported at any one of the designated mounting locations so as to be readily separable from the clamp member. Position of the pipe engaging members is thus readily adjustable in the circumferential direction.

Preferably each pipe engaging member includes a threaded fastener rotatably retained within a bore extending through a body of the pipe engaging member in which the threaded fastener is arranged for threaded connection with the clamp member.

The designated mounting locations formed on clamp member are preferably evenly spaced apart.

Various embodiments of the invention will now be described in conjunction with the accompanying drawings in which:

BRIEF DESCRIPTION OF THE DRAWINGS

FIG. 6 is a side elevational view of a second embodiment of one of the pipe engaging members;

FIG. 7 is an elevational view of the pipe engaging member according to the second embodiment of FIG. 6 as viewed radially outward from the longitudinal axis;

FIG. 8 is an elevational view of the pipe engaging member according to the second embodiment of FIG. 6 from the opposing direction relative to FIG. 7;

In the drawings like characters of reference indicate corresponding parts in the different figures.

DETAILED DESCRIPTION

Figure 1:
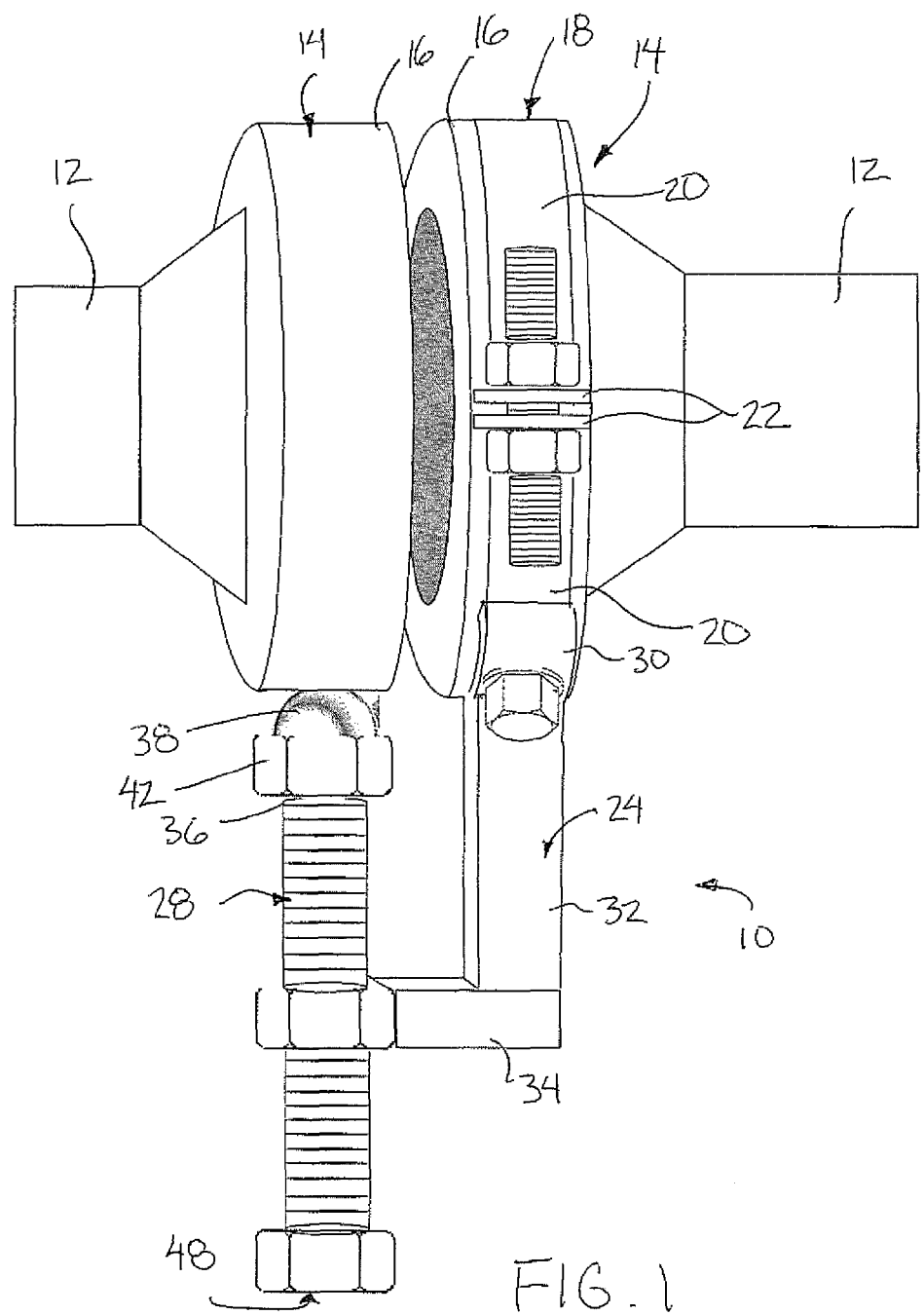
FIG. 1 is a perspective view of the pipe alignment tool according to a first embodiment.

Referring to the accompanying figures, there is illustrated a pipe alignment tool generally indicated by reference numeral 10. The tool 10 is suited for joining two pipe sections 12 such that the ends 14 are abutted in alignment with one another forming a seam between the abutted ends where the pipe sections. The pipe sections may be joined either by welding or by bolting together flanges 16 at the ends of the pipe as shown in the illustrated embodiment.

The tool 10 is particularly suited for clamping onto a first pipe section 12 adjacent the end thereof, for example about the end flange 16 while engaging the second pipe similarly at the end flange 16 to support and align the second pipe relative to the first pipe. The tool engages the second pipe with a rolling contact adjacent the end of the pipe such that the second pipe remains freely rotatable about its longitudinal axis as well as being readily movable in an axial or longitudinal direction.

Although two embodiments are illustrated in the accompanying Figures, the common features of the two embodiments will first be described herein.

The tool generally comprises a clamp member 18 which clamps onto the first pipe section. The clamp member is a generally annular member which encircles a longitudinal axis so as to be adapted to be clamped circumferentially about the first pipe section in which the longitudinal axis of the clamp is aligned with the longitudinal direction of the pipe section.

More particularly, the clamp member 18 comprises two semi-circular portions 20, each extending near 180 degrees about the circumference of the pipe section. Opposing ends of each portion 20 include bolt flanges 22 projecting radially outward from the longitudinal axis with bolt apertures formed therein such that the bolt flanges of one portion 20 can be bolted to the corresponding flanges of the other portion to fully encircle the pipe section and clamp the pipe section therebetween. Due to the two portions each spanning less than 180 degrees, a gap remains between the opposing ends of the two portions so that tightening the bolts joining the bolt flanges causes the clamp member 18 to be clamped and frictionally retained relative to the pipe.

In the illustrated embodiments, one pipe engaging member 24 is mounted on the clamp member 18 so as to be positioned adjacent the bottom of the pipe in use so that the second pipe section can rest on the pipe engaging member to carry the weight of the second pipe section on the first pipe section during relative alignment. Typically a plurality of pipe engaging members 24 are mounted at circumferentially spaced positions about the longitudinal axis of the clamp member so that the pipe engaging members 24 collectively center the second pipe coaxially with the first pipe. More particularly, a set of four pipe engaging members at evenly spaced positions in the longitudinal direction is particularly advantageous for optimally supporting the two pipe sections relative to one another.

Each pipe engaging member 24 comprises a first portion 26 fixed to the clamp member and a second portion 28 which is adjustably coupled to the first portion and adapted to engage the second pipe in rolling contact therewith.

The first portion includes a base portion 30 secured to a respective portion 20 of the clamp member in fixed relation either by welding or by securing the base portion with bolts to studs welded on the clamp member. A leg 32 extends radially outward from the base portion in relation to the longitudinal axis of the clamp member. An arm 34 of the first portion is fixed to the leg 32 and extends axially in the longitudinal direction from a first end fixed to the leg at a location spaced radially outward from the base portion to an opposing second end adapted to overlap the second pipe by spanning across the seam between the abutted pipe sections.

The second portion 28 is connected to the second end of the arm 34 of the first portion so as to extend radially inward towards an inner end 36 for engaging the second pipe. The second portion generally comprises an elongate threaded rod which is threadably received through a threaded aperture or nut formed at the second end at the arm of the first portion. Accordingly rotating the rod about a respective radial axis of the clamp causes the second portion to be radially displaced and adjusted in radial position relative to the clamp member and the pipe section upon which it is secured.

A bearing member 38 is mounted at the inner end of the second portion in the form of a freely rolling ball received within a socket 40 formed in the inner end of the second portion of the pipe engaging member. A cap member 42 is threaded onto the inner end of the second portion overtop of the ball defining the bearing member 38 so as to retain the bearing member within the socket. A central opening in the cap 42 allows the bearing member to protrude outwardly beyond the cap for rolling contact with the second pipe with which it engages.

The bearing is supported for free rotation in the any direction including rolling movement about an axis parallel to the longitudinal axis when rotating the second pipe about its longitudinal axis as well as rolling movement about an axis perpendicular to the longitudinal direction when axially displacing the second pipe towards and away from the first pipe.

The socket 40 is suitably sized to allow some radial displacement of the bearing member within the socket relative to the first and second portions of the pipe engaging member. A spring 44 is mounted within the socket between the bearing member and the internal end of the socket so as to urge the bearing member in the radial direction relative to the second portion 28 towards the central longitudinal axis about which the clamp is aligned.

A grease port 46 is formed to extend in a radial direction through the second portion 28 of the pipe engaging member for communication at an inner end with the bearing member in the socket 40 and for communication at an outer end with a nipple 48 formed on the outer end of the second portion. The nipple includes an injection port therethrough permitting attachment of a suitable grease gun or the like to inject grease through the grease port to maintain the bearing member well lubricated relative to the socket.

Figure 2:
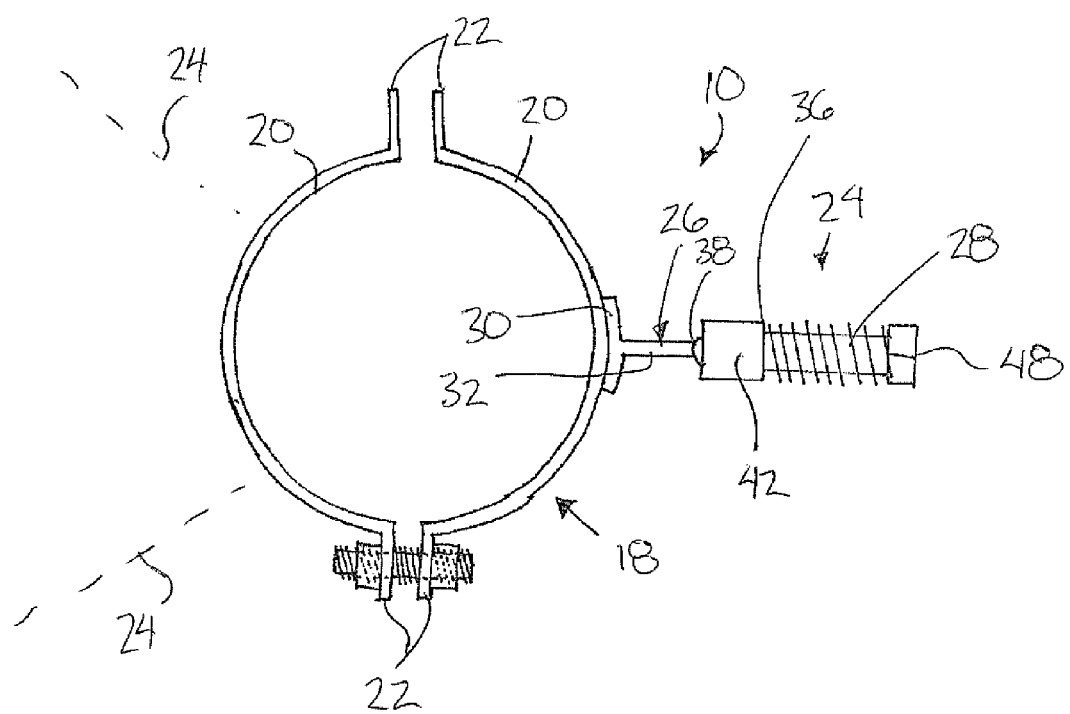
FIG. 2 is an end elevational view of the pipe alignment tool according to the first embodiment of FIG. 1.
Figure 3:
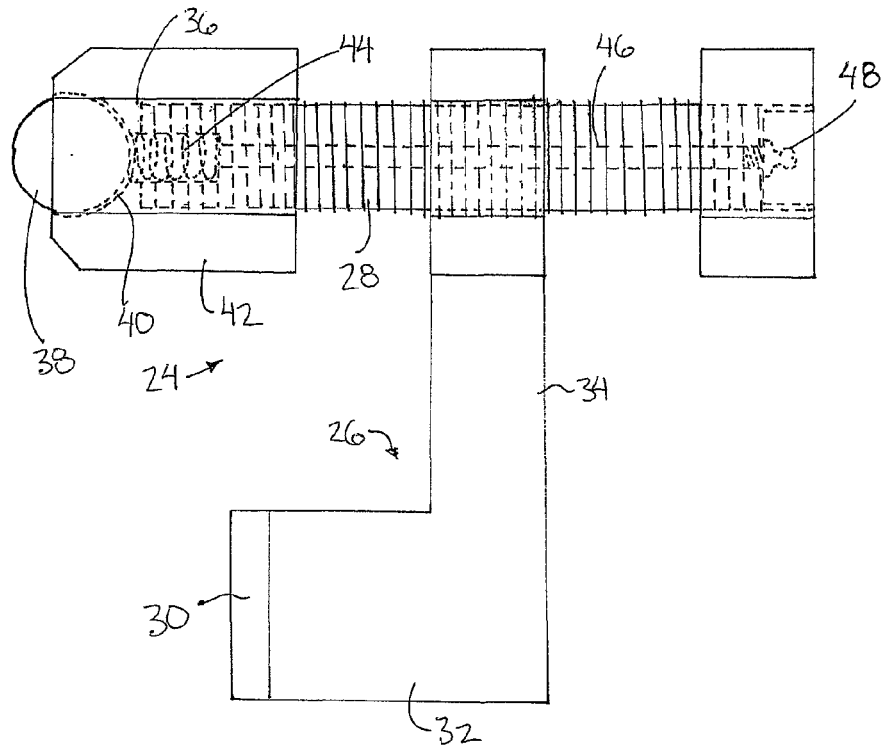
FIG. 3 is a side elevational view of one of the pipe engaging members according to the first embodiment of FIG. 1.
Figure 4:
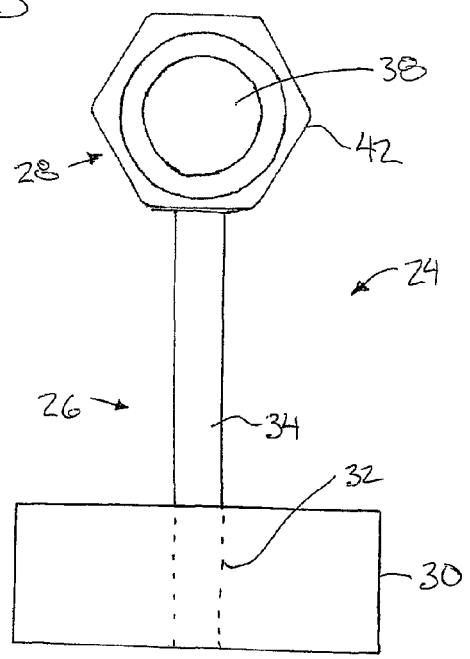
FIG. 4 is an elevational view of the pipe engaging member according to the first embodiment of FIG. 1 as viewed radially outward from the longitudinal axis.

Turning now to the embodiment of FIGS. 1 through 4 the base portion 30 in this instance comprises a flange which extends in the circumferential direction for overlapping an outer surface of a portion of the clamp member. The flange is joined by welding or by various fastening techniques to the clamp member at a selected mounting location. The leg 32 and the arm 34 are integrally joined in fixed and seamless connection with the flange forming the base portion 30.

Figure 5:
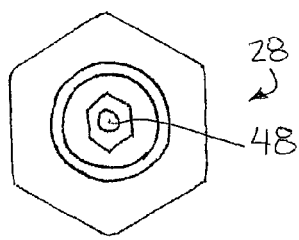
FIG. 5 is an elevational view of a portion of the pipe engaging member according to the first embodiment of FIG. 1 from the opposing direction relative to FIG. 4.
Figure 9:
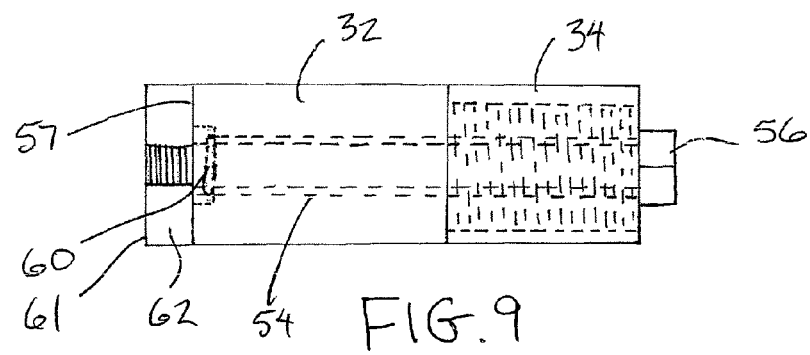
FIG. 9 is a first end elevational view of the pipe engaging member according to the second embodiment of FIG. 6.
Figure 10:
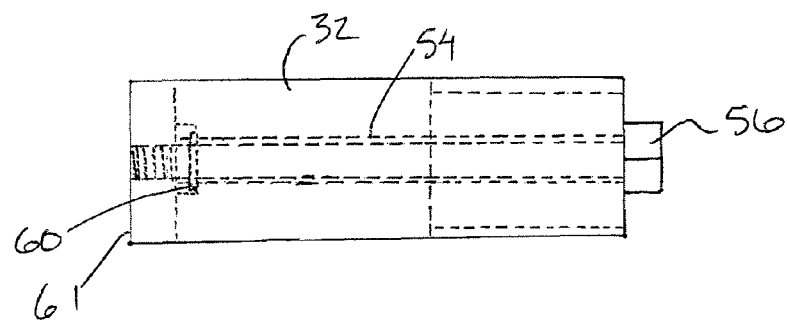
FIG. 10 is a second end elevational view of the pipe engaging member according to the second embodiment of FIG. 6.
Figure 11:
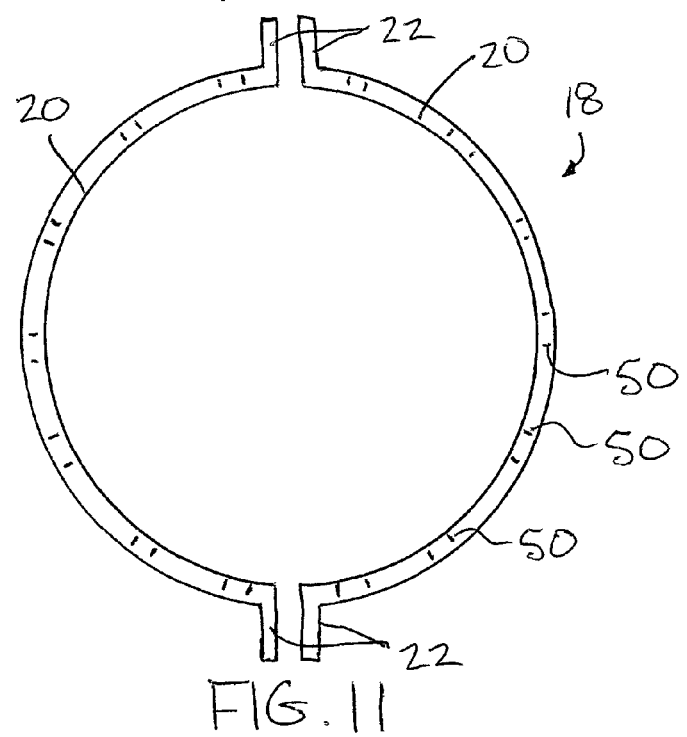
FIG. 11 is a schematic representation of the clamp member according to the second embodiment of FIG. 6.

Turning now to the embodiment of FIGS. 5 through 9, the clamp member includes a plurality of designated mounting locations 50 formed thereon at circumferentially spaced apart positions in which each pipe engaging member is arranged to be selectively supported at any one of the designated mounting locations so as to be readily separable from the clamp member. The designated mounting locations 50 comprise respective threaded bores formed in the collar of the clamp member about respective radially oriented axis at evenly spaced apart positions, for example at 1.5 inch intervals in the circumferential direction.

Position of each pipe engaging members is thus readily adjustable in the circumferential direction. This is desirable for example to position the pipe engaging members out of the way of obstructions that would prevent stud and bearing from contacting the other surface. Another advantage to adjustable placement of the pipe engaging members is when a gasket needs to be installed between the flanges. Because of the circular gasket design for flanges, there is a certain amount of spacing required in order for the gasket to fit between the studs and bearings. More typically a user would place four pipe engaging members equally spaced around the collar of the clamping member to maximize the alignment of the circular surfaces relative to one another.

Each pipe engaging member in this instance includes a main body 52 defining the leg 32 and the arm 34 noted above. A bore 54 extends fully through the main body in a radial direction relative to the clamp member and pipe sections in alignment with the leg 32 to receive a threaded bolt 56 extending fully therethrough. A head of the bolt 56 is arranged to abut an outer side of the body 52 while the opposing threaded end of the bolt 56 protrudes radially inwardly beyond an engaging surface 57 about the bore the inner side of the body 52 which abuts the corresponding outer surface of the clamp member in a mounted position. As shown in the accompanying figures, each pipe engaging member 24 abuts an outer surface of the clamp member 18 so as to permit removal from the clamp member and reattachment to the clamp member at a different mounting location 50 while the clamp member 18 remains secured about a respective pipe section 12. The threaded end of the bolt is thus arranged to be received in threaded connection into a selected one of the threaded bores in the clamp member when the body is abutted with the outer side of the clamping member. The bolt has a suitable length such that the threaded end protrudes from the body by a radial distance which is less than a radial thickness of the body of the clamping member, which may be ⅝ of an inch for example, such that the bolts do not engage through the clamp member into the pipe sections.

The bore 54 receiving the bolt 56 therein is sufficient oversized relative to the bolt that the bolt is freely rotatable within the bore. The inner end of the bore includes a recessed counter bore 58 of increased diameter to accommodate a snap ring 60 in a corresponding groove about the bolt. The groove in the bolt is located relative to the bolt head so as to be received within the counter bore 58 when the bolt head is abutted with the outer side of the body. The snap ring 60 serves to retain the bolt rotatable within the bore 54 by abutment with an inner end face of the counter bore 58 even when the bolt is threadably released from a corresponding bore in the clamp member such that the bolt remains readily accessible for reattachment to the clamp member at a different mounting location.

The inner end of the leg portion 32 of the body is stepped to define the engaging surface 57 which is recessed radially into the body relative to a remaining end face 61. The resulting shoulder 62 defined between the engaging surface 57 abutting the outer side of the clamp member and the remaining end face 61 is located relative to the bolt and threaded bore such that the shoulder abuts a corresponding end face 64 of the clamp member when the bolt and threaded bore are aligned.

In an alternative embodiment of the present invention, the second portion 28 of the pipe engaging member comprises a hydraulic piston cylinder assembly in which the cylinder is anchored onto the first portion 26 and the piston is extendible relative to the cylinder to extend radially inward towards the central longitudinal axis. The bearing member 38 in this instance is supported within a respective socket 40 in the inner end of the piston. Hydraulic pressure can be used to urge the bearing member inwardly into engagement with the pipe section in this instance such that a spring member 44 may not be required within the socket.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A pipe alignment tool for aligning abutted ends of first and second pipe sections to be joined, the tool comprising:
   a clamp member extending about a longitudinal axis so as to be adapted to be clamped circumferentially about the first pipe section adjacent the end of the pipe;
   at least one pipe engaging member mounted on the clamp member so as to extend longitudinally from a first end fixed to the clamp member to an opposing second end adapted to overlap the second pipe section such that the pipe engaging member extends across a seam between the abutted ends of the first and second pipe sections;
   said at least one pipe engaging member further comprising a first portion extending in a direction of the longitudinal axis and a second portion at the second end of the member extending in a radial direction from the first portion towards an inner end supporting the bearing member rotatably thereon, in which the second portion is adjustable in a radial direction relative to the first portion;
   a bearing member rotatably supported on the second portion of said at least one pipe engaging member so as to be adapted for rolling contact with the second pipe section and so as to be movable in the radial direction relative to the second portion of the pipe engaging member; and
   a biasing member operatively connected to the bearing member of said at least one pipe engaging member so as to urge the bearing member of said at least one pipe engaging member in the radial direction towards the longitudinal axis.

2. The tool according to claim 1 wherein the bearing member is supported on said at least one pipe engaging member for rolling movement about an axis oriented parallel to the longitudinal axis of the clamp member.

3. The tool according to claim 1 wherein the bearing member is supported on said at least one pipe engaging member for rolling movement about an axis oriented perpendicularly to the longitudinal axis of the clamp member.

4. The tool according to claim 1 wherein the bearing member comprises a ball supported on said at least one pipe engaging member for rolling movement about both an axis oriented parallel to the longitudinal axis and an axis oriented perpendicularly to the longitudinal axis of the clamp member.

5. The tool according to claim 1 wherein there is provided a grease port formed in said at least one pipe engaging member in communication between the bearing member and a nipple supported on the pipe engaging member spaced from the bearing member.

6. The tool according to claim 1 wherein the second portion comprises a threaded rod in threaded connection with the first portion.

7. The tool according to claim 1 wherein the second portion comprises a hydraulic piston cylinder supported on the first portion.

8. The tool according to claim 1 further comprising a bearing cap member threadably secured on said at least one pipe engaging member so as to selectively retain the bearing member on said at least one pipe engaging member.

9. A pipe alignment tool for aligning abutted ends of first and second pipe sections to be joined, the tool comprising:
   a clamp member extending about a longitudinal axis so as to be adapted to be clamped circumferentially about the first pipe section adjacent the end of the pipe;
   at least one pipe engaging member mounted on the clamp member so as to extend longitudinally from a first end fixed to the clamp member to an opposing second end adapted to overlap the second pipe section such that the pipe engaging member extends across a seam between the abutted ends of the first and second pipe sections; and
   a bearing member rotatably supported on said at least one pipe engaging member so as to be adapted for rolling contact with the second pipe section;
   wherein the clamp member includes a plurality of designated mounting locations formed thereon at circumferentially spaced apart positions; and
   wherein said at least one pipe engaging member is arranged to be selectively supported at any one of the designated mounting locations in abutment with an outer surface of the clamp member so as to be readily separable from and reattachable to the clamp member while the clamp member is clamped circumferentially about the first pipe section.

10. The tool according to claim 9 wherein said at least one pipe engaging member comprises a plurality of pipe engaging members at circumferentially spaced positions about the longitudinal axis of the clamp member.

11. The tool according to claim 10 wherein said at least one pipe engaging member comprises four pipe engaging members at evenly circumferentially spaced positions about the longitudinal axis of the clamp member.

12. The tool according to claim 9 wherein said at least one pipe engaging member is arranged to be secured to the clamp member using a threaded fastener.

13. The tool according to claim 9 wherein said at least one pipe engaging member includes a threaded fastener rotatably retained thereon which is arranged for threaded connection with the clamp member.

14. The tool according to claim 9 wherein the designated mounting locations are formed on clamp member are evenly spaced apart.

15. The tool according to claim 9 wherein the clamp member includes an end face and wherein an inner end of said at least one pipe engaging member is stepped to define a first end surface in abutment with the outer surface of the clamp member, a second end surface offset radially from the first end surface, and a shoulder surface between the first and second end surfaces which is in abutment with the end face of the clamp member.

16. A method of aligning abutted ends of first and second pipe sections to be joined, the method comprising:
   providing a pipe alignment tool comprising i) a clamp member which is annular about a longitudinal axis, ii) at least one pipe engaging member arranged to be mounted on the clamp member so as to extend longitudinally from a first end fixed to the clamp member to an opposing second end adapted to overlap the second pipe section, and iii) a ball bearing member rotatably supported on said at least one pipe engaging member;
   clamping the clamp member circumferentially about the first pipe section adjacent the end of the pipe;
   fixing the first end of said at least one pipe engaging member to the clamp member such that the pipe engaging member extends across a seam between the abutted ends of the first and second pipe sections;
   engaging the ball bearing member of said at least one pipe engaging member in rolling contact with the second pipe section so as to enable the second pipe section to be freely adjusted in position both axially and rotationally relative to the first pipe section by a rolling movement of said ball bearing member about both an axis oriented parallel to the longitudinal axis and an axis oriented perpendicularly to the longitudinal axis of the clamp member.

17. The method according to claim 16 wherein said at least one pipe engaging member comprises a plurality of pipe engaging members at circumferentially spaced apart positions and wherein the method further comprises separating one of the pipe engaging members from the clamp member and reattaching said one of the pipe engaging members to the clamp member while the clamp member remains clamped circumferentially about the first pipe section.

\* \* \* \* \*